Oct. 28, 1969     J. M. HOLLANDER     3,475,567
ELECTRICAL DISTRIBUTION SYSTEMS
Filed Aug. 28, 1967     3 Sheets-Sheet 1

INVENTOR:-
JOHN MICHAEL HOLLANDER

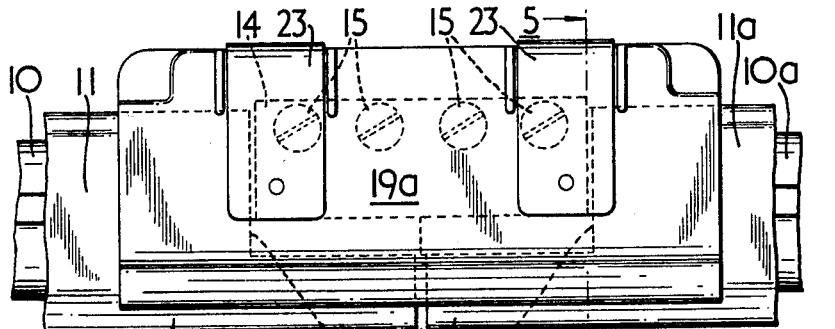
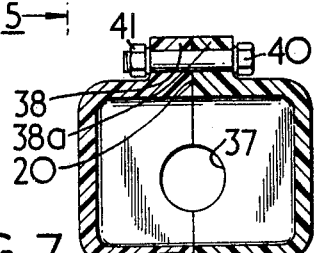
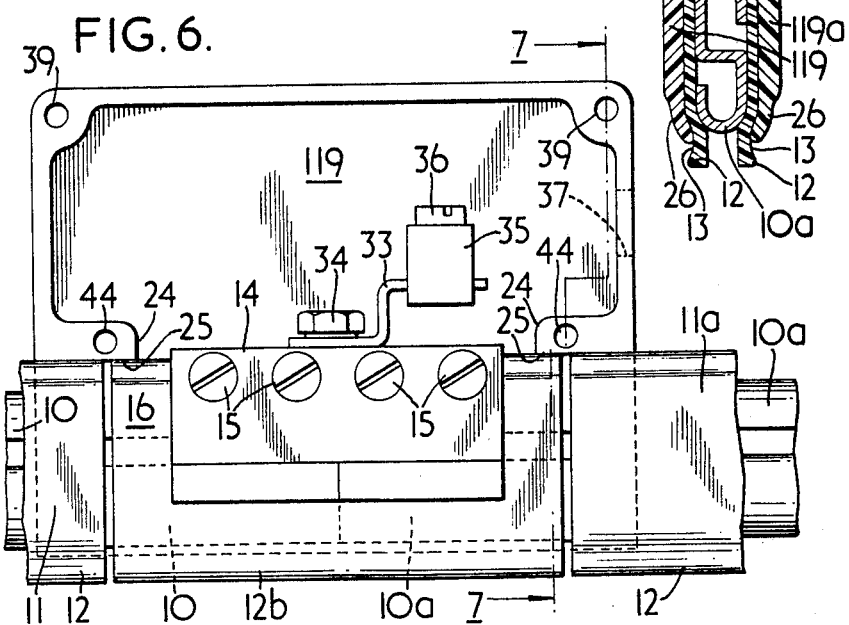

United States Patent Office 3,475,567
Patented Oct. 28, 1969

3,475,567
ELECTRICAL DISTRIBUTION SYSTEMS
John Michael Hollander, Kenilworth, England, assignor to E.M.S. Electrical Products Limited, Kenilworth, England
Filed Aug. 28, 1967, Ser. No. 663,725
Claims priority, application Great Britain, Aug. 11, 1967, 36,982/67
Int. Cl. B60m 1/00, 1/24
U.S. Cl. 191—22
8 Claims

ABSTRACT OF THE DISCLOSURE

An electrical distribution system including aligned sections which each have a length of naked conductor located in a length of insulating sheath of U-shaped cross-section formed with its lips sufficiently spaced apart to admit an external travelling current collector to make contact with the conductor, and with the said lips of the sheaths of the sections aligned to provide a guide for the travelling collector, has the backs of the adjacent ends of the sheaths longitudinally spaced remotely from the guiding lips for permitting the adjacent lengths of conductor to be joined, and an insulating cover detachably held over the gaps thus left.

---

Figure 1:
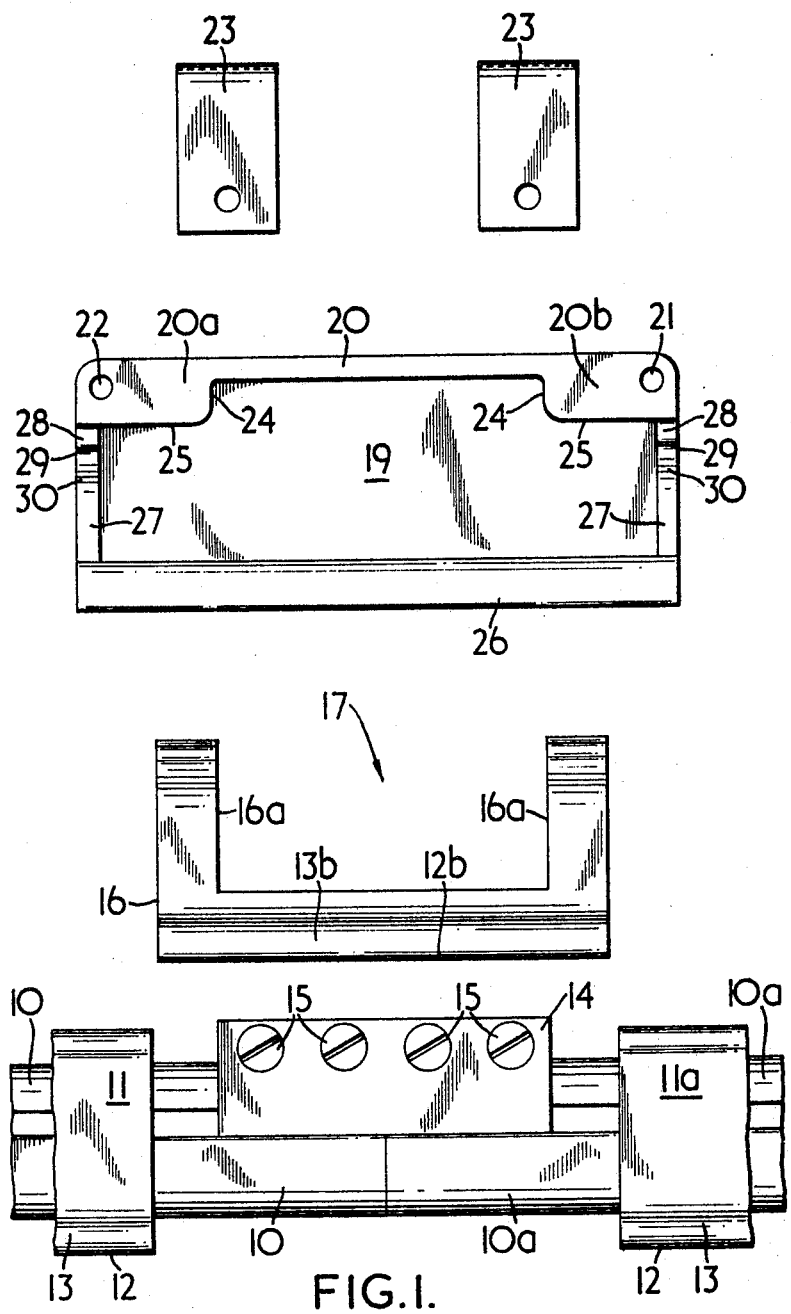

The invention relates to an electrical distribution system of the kind including at least two aligned sections which each comprises a length of naked conductor located in a length of insulating sheath of U-shaped cross-section formed with its lips sufficiently spaced apart to admit an external travelling current collector to make contact with the conductor, and with the lips of the sheaths of the sections aligned to provide a guide for the travelling collector, and has for its object to enable the electrical connections between successive lengths of conductor to be made conveniently, and masked safely during use.

According to the invention an electrical distribution system of the kind set forth has the adjacent lengths of sheath defining between them an opening which is remote from the guides and through which access can be had for effecting the electrical connections between the lengths of conductor, and each access opening is closed by an insulating cover which overlaps the bights and sides of the adjacent ends of the sheaths at both sides of the opening and is detachably fast with them. In this way easy access for the making of the electrical connections between the successive lengths of conductors is provided, and the joint is afterwards insulated by the cover when placed in position.

According to a further feature the access opening is formed by removing a portion in the region of the bight of the U-shaped cross-section of at least one of the sheaths. Thus, the access opening can be provided by removing a bight portion at the end of one of the conductor sheaths so as to leave the lipped portion extending towards the adjacent conductor sheath, or similar bight portions can be removed from both conductor sheaths leaving their residual lipped portions extending towards each other.

According to another feature the access opening is formed by spacing the adjacent ends of the sheaaths away from each other and from the conductor-connecting means, and inserting between the spaced ends of the sheaths a bridging portion of U-cross-sectioned sheath having its outer surface forming a continuity of the outer surfaces of the conductor sheaths and provided with an opening in and adjacent to its bight portion to give access to the conductor-connecting means. Such a bridging portion is preferably of identical cross-sectional shape and size as the conductor sheaths.

According to a still further feature the lips of the conductor sheaths (and of the bridging sheath, if used) have external aligned grooves parallely spaced from their edges, and the insulating cover is of U-shaped cross-section with its lips in-turned to engage the grooves both for locating it against movement in a direction transverse to the sheaths and to hold the lips of the conductor sheaths (and of the bridging sheath, if used) against separating movement.

In such a case, and according to yet another feature the insulating cover has abutments on its inner surface to engage the adjacent ends of the conductor sheaths to prevent it sliding longitudinally out of the position in which it covers the opening.

Also in such a case, and according to still further features the insulating cover is made from two complementary halves which are detachably interconnected during use, and the two complementary halves are detachably interconnected by at least one U-shaped spring clip.

Figure 2:
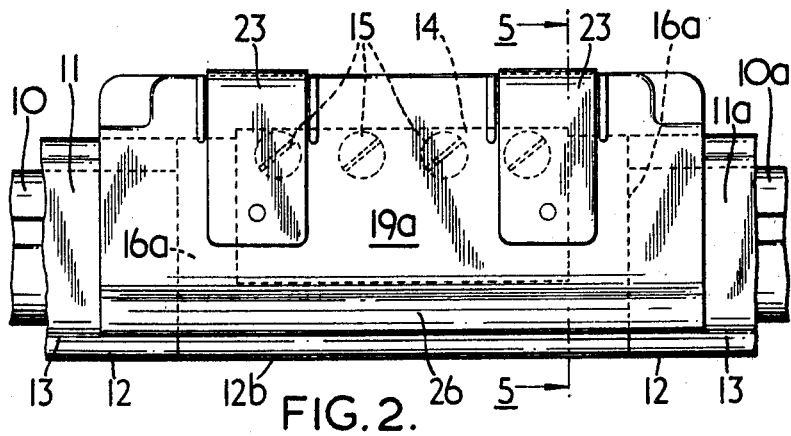
Figure 3:
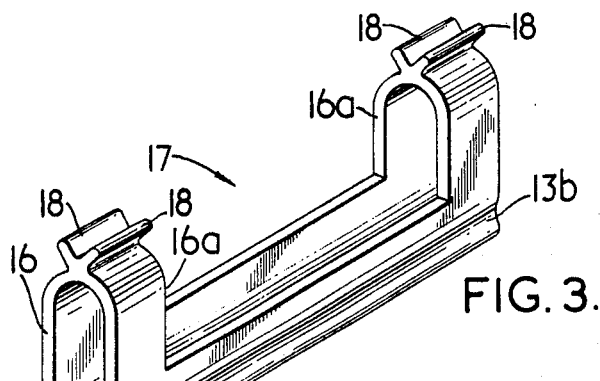
Figure 5:
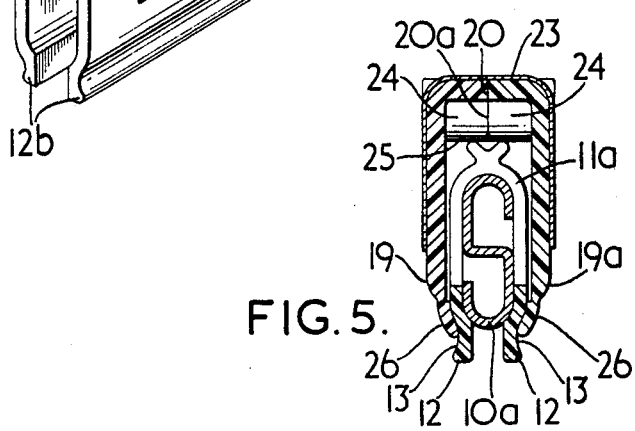

In the accompanying drawings:
FIGURE 1 is a side elevation of one embodiment of the invention, with the various parts shown in exploded positions;
FIGURE 2 corresponds to FIGURE 1 but shows the parts assembled into their operative positions;
FIGURE 3 is a perspective view of a bridging sheath shown in FIGURES 1 and 2;
FIGURE 4 is a view like FIGURE 2 but illustrating another embodiment;
FIGURE 5 is a section on the line 5—5 of both FIGURES 2 and 4;
FIGURE 6 is a view like FIGURE 1, but modified to provide a feed point, and
FIGURE 7 is a section on the line 7—7 of FIGURE 6.

FIGURES 1, 2 and 4 show the adjacent ends of two adjacent sections of an electrical distribution system. Each section has a conductor of S cross-section located within an insulating sheath of an inverted, substantially U cross-section, the conductor and sheath of the left-hand section being shown at 10 and 11 respectively and those of the right-hand section at 10a, 11a.

FIGURE 5 shows the cross-section of the sheath, and it will be seen that it is substantially of uniform thickness with its side walls parallel, but more closely spaced at its open end where it forms a pair of lips 12 with grooves 13 on their outwardly facing sides. The rounded upper edge of the conductor is held against the rounded internal bight of the U cross-section of the sheath by concavely rounded shoulders at the roots of the lips, and the spacing of the latter permits an external, travelling, current collector (not shown) to make contact with the lower edge of the conductor, and to guide its movement along the aligned sections. The spacing of the lips is sufficiently narrow as to protect personnel from touching the conductor from outside the sheath when the system is live.

When assembling the adjacent sections to form a distribution system the successive conductors have to be electrically connected to each other, and when that has been done they must be insulated from the outside.

This is done in the embodiment illustrated by FIGURES 1 to 3 by making the sheaths 11, 11a terminate short of the adjacent ends of their respective conductors 10, 10a whereby to provide an access opening for placing a connector 14 in position. The connector shown, which does not form part of the present invention, is formed in two parts which are shaped to engage over the upper part of the S cross-section conductors and which are held in clamping relation thereto by screws 15. Other forms of connector can be used, particularly when the conductors employed are of other than S cross-section.

By effecting the connection of the conductors 10, 10a in this way an undesirable gap is left between the guiding lips 12 of sheath 11 and those of sheath 11a, and in order to compensate for this the sheaths are spaced from the ends of the connector 14, and a length 16 of insulating sheath, provided with lips 12b and 13b is inserted to bridge the space between the sheaths 11 and 11a and it is provided with a window to straddle the connector 14. Such a sheath is shown at 16 in FIGURES 1 and 3, from which it will be seen that it has a loop 16a of the same cross-section as sheaths 11 and 11a at each end, joined by an integral portion with lips 12b which forms the bottom of the window, which latter is indicated by the arrow 17.

The sheath 16 may be made from the same stock as the sheaths 11 and 11a; and in the example shown the sheath stock is provided on the back of the bight with a pair of upwardly divergent flanges 18 which serve to support it in longitudinally spaced positions from hangers (not shown).

Reverting to FIGURE 1 loops 16a are of a size to fit snugly into the spaces between the ends of the connector 14 and the adjacent ends of sheaths 11, 11a so that when the bridging sheath 16 is fully in position the lower edge of window 17 is below the connector 14, and the lips 12b of sheath 16 are aligned with the lips 12 of sheaths 11, 11a as indicated in FIGURE 2.

To hold the bridging sheath 16 in its assembled position use is made of a two-part insulating clamp which overlaps the adjacent ends of sheaths 11, 11a.

Such a clamp is shown in FIGURES 1, 2 and 5. The two parts are respectively indicated generally at 19 and 19a, and each of them has a longitudinally directed planar face 20, 20a, 20b at the top. The face 20b of each part is provided with a dowel 21 which fits into a recess 22 in the face 20a of the other part when the two of them are abutted with their faces 20, 20a, 20b in contact, and they are held in this position by a pair of spring clips 23 when assembled on the insulating sheaths 11, 11a.

The faces 20a and 20b are deeper than the faces 20 so as to form internal shoulders 24 which engage the ends of the connector 14 for locating the clamp endwise on sheaths 11, 11a, and the downwardly facing surfaces 25 of faces 20a and 20b engage the tops of the loops 16a to hold the bridging sheath 16 in vertical alignment with the sheaths 11 and 11a.

Each of the parts 19, 19a terminates in an in-turned lip 26 at the bottom which engages in the grooves 13 of the sheaths 11, 11a and also in the grooves 13b of sheath 16 to ensure that the lips 12b of the latter are correctly positioned.

Although the clamp 19, 19a is generally of inverted U-formation its ends are formed interiorly to conform to the exterior cross-section of sheaths 11, 11a where it overlaps them. Thus, FIGURE 1 shows clamp part 19 as being provided with end walls 27 which are shaped at 28, 29 and 30 closely to engage round the upwardly divergent flanges 18 of the said sheaths and to hug their exterior walls.

As an alternative to the use of spring clips 23, the dowels 21 and recesses 22 could be replaced by through-holes to receive bolts, with nuts, for securing the clamp parts 19, 19a together, but in either event the said clamp parts are identical to each other and can be made from the same mould.

It is believed that the exploded view of FIGURE 1 shows sufficiently clearly how the elements are assembled to the condition shown by FIGURE 2; and conversely how they can be dismantled.

In the modified construction shown in FIGURE 4 the bridging sheath 16 is dispensed with, and instead the sheaths 11 and 11a are rectilinearly foreshortened above their lips 12 as indicated by the stops 31, 31a. This foreshortening provides the equivalent of window 17 around the connector 14. The two part clamp 19, 19a can be the same as in the previous construction.

It will be noted from FIGURE 4 that a clearance 32 is left between the adjacent ends of the lips 12 so as to provide a tolerance for assembly purposes; and of course a similar provision could be made in the construction shown in FIGURE 1 by, say, leaving a clearance (not shown) between the bridging sheath 16 and the adjacent ends of sheaths 11, 11a.

Referring to FIGURES 6 and 7 it will be seen that the connector 14 has a bracket 33 fixed to it by a screw 34, and that this bracket supports a terminal 35 provided with a clamping screw 36. The two-part clamp 119, 119a is of increased size so as to accommodate the bracket and terminal, and it defines an opening 37 in one end wall through which a feed cable (not shown) can be passed for connection to the terminal.

In this case, instead of relying on spring clips like 23 to hold the two parts together they are provided with flanges 38, 38a at the top having two spaced holes 39 through which a pair of bolts 40 are passed and secured by nuts 41, and lower down they are secured together by bolts 42 and nuts 43 passed through holes 44 intersecting their abutting planar faces 20a.

Obviously, other forms of feeding cable attachments with appropriately shaped two-part clamps could be used instead.

What I claim as my invention and desire to secure by Letters Patent of the United States is:

1. An electrical distribution system including aligned sections which each have a length of naked conductor located in a length of insulating sheath of U-shaped cross-section formed with its lips sufficiently spaced apart to admit an external travelling current collector to make contact with the conductor, and with the said lips of the sheaths of the sections aligned to provide a guide for the travelling collector, in which the lengths of sheath of adjacent sections define between them an opening through which access can be had for effecting electrical connections between the associated lengths of conductor, and comprising an insulating cover which overlaps the adjacent ends of the sheaths at both sides of the opening and is detachably located thereby, the said insulating cover having abutments on its inner surface to engage the adjacent ends of a conductor-connecting means to prevent the insulating cover sliding longitudinally out of the position in which it covers the opening.

2. An electrical distribution system, according to claim 1 in which the access opening is formed by removing a portion in the region of the bight of the U-shaped cross-section of at least one of the sheaths.

3. An electrical distribution system, according to claim 1 in which the access opening is formed by spacing the adjacent ends of the sheaths away from each other and from the conductor-connecting means, and inserting between the spaced ends of the sheaths a bridging portion of U-cross-sectioned sheath having its outer surface forming a continuity of the outer surfaces of the conductor sheaths and provided with an opening in and adjacent to its bight portion to give access to the conductor connecting means.

4. An electrical distribution system, according to claim 3 in which the bridging portion of sheath is of identical cross-sectional shape and size as the conductor sheaths.

5. An electrical distribution system, according to claim 1 in which the lips of the conductor sheaths have external aligned grooves parallely spaced from their edges, and the insulating cover is of U-shaped cross-section with its lips in-turned to engage the grooves both for locating it against movement in a direction transverse to the sheaths and to hold the lips of the conductor sheaths against separating movement.

6. An electrical distribution system, according to claim 3 in which the conductor sheaths and the bridging sheath have external aligned grooves parallely spaced from their edges, and the insulating cover is of U-shaped cross-section with its lips in-turned to engage the grooves both for locating it against movement in a direction transverse to the sheaths and to hold the lips of the conductor sheaths and the bridging sheath against separating movement.

7. An electrical distribution system, according to claim 1 in which the insulating cover is made from two complementary halves which are detachably interconnected during use.

8. An electrical distribution system, according to claim 7 in which the two complementary halves of the insulating cover are detachably interconnected by a U-shaped spring clip.

References Cited
UNITED STATES PATENTS

| | | | |
|---|---|---|---|
| 2,924,674 | 2/1960 | Taylor | 191—44.1 |
| 2,994,734 | 8/1961 | Scofield | 191—44.1 |
| 3,337,697 | 8/1967 | Martin | 191—23 |
| 3,399,281 | 8/1968 | Corl | 191—23 |

ARTHUR L. LA POINT, Primary Examiner

D. F. WORTH III, Assistant Examiner

U.S. Cl. X.R.

191—44